United States Patent [19]

Staudacher

[11] Patent Number: 4,587,779

[45] Date of Patent: May 13, 1986

[54] SYSTEM FOR PROTECTING A BODY FROM MOTIONS TRANSMITTED THROUGH THE GROUND

[75] Inventor: Konrad Staudacher, Zurich, Switzerland

[73] Assignee: Seisma AG., Zurich, Switzerland

[21] Appl. No.: 769,794

[22] Filed: Aug. 26, 1985

Related U.S. Application Data

[63] Continuation of Ser. No. 263,458, May 15, 1981, abandoned.

[51] Int. Cl.$^4$ .................. E04H 9/02; E02D 27/34
[52] U.S. Cl. ......................... 52/167; 248/560; 248/634
[58] Field of Search ............ 52/167, 99, 98, 393, 52/575; 248/560-635

[56] References Cited

U.S. PATENT DOCUMENTS

| | | | |
|---|---|---|---|
| 100,262 | 3/1870 | Cooper | 52/167 |
| 981,824 | 1/1911 | Veres | 52/167 |
| 1,651,411 | 12/1927 | Porter | 52/167 |
| 3,638,377 | 2/1972 | Caspe | 52/167 |
| 3,748,800 | 7/1973 | Glicksberg | 52/167 |
| 3,761,068 | 9/1973 | Suh | 52/167 X |
| 3,794,277 | 2/1974 | Smedley | 52/167 |
| 3,796,017 | 3/1974 | Meckler | 52/167 X |
| 4,179,104 | 12/1979 | Skinner et al. | 52/167 X |
| 4,187,573 | 2/1980 | Fyfe et al. | 52/167 X |

FOREIGN PATENT DOCUMENTS 2327055  12/1974  Fed. Rep. of Germany ........ 52/167

OTHER PUBLICATIONS

Earthquake Engineering and Structural Dynamics, vol. 7, pp. 555-568, Base Isolation Systems For Earthquake Protection of Multi-Storey Shear Structures, Lee & Medland.

*Primary Examiner*—Alfred C. Perham
*Attorney, Agent, or Firm*—Browdy and Neimark

[57] ABSTRACT

A mechanically fully isolated body (D) is connected by mechanical isolators (C), behaving elastically in all directions, with its basis (B). This basis is linked firmly to the surrounding formation. There exists a frequency range called hole of eigenfrequencies between the highest (6) of the six lowest system eigenfrequencies (1-6-)—called fundamental eigenfrequencies—and the lowest (7) of all higher eigenfrequencies (7,8 . . . )—called upper eigenfrequencies—of the oscillatory element consisting of the body (D) and the isolators (C). In this range the oscillatory element presents no eigenfrequencies. The hole of eigenfrequencies shall cover the range of resonance of the relevant design response spectrum of the excitation (E). By these measures the body resists to the strongest earthquakes measured or to be expected at that site.

13 Claims, 5 Drawing Figures

SYSTEM FOR PROTECTING A BODY FROM MOTIONS TRANSMITTED THROUGH THE GROUND

This application is a continuation of application Ser. No. 263,458, filed May 15, 1981, now abandoned.

BACKGROUND OF THE INVENTION

The invention refers to a mechanically in all directions isolated body, in particular a construction, machine or isolator station, which is connected to its base by mechanical isolators behaving elastically in all directions. The base is linked firmly to the subsoil.

By appropriate technical measures the body resists without damage the strongest earthquakes ever measured or to be expected at a given site: Integral Earthquake Protection. By that is meant the ability of the protected part of the body to resist repeatedly extreme seismic excitations without elasto-plastic deformations of the structural frame.

It is a continuous concern of modern architecture to construct safely in seismic regions. No satisfactory results could be produced up to now after years of intense research and development, and it has not been possible until now to protect structures completely against extreme earthquakes under all conditions. Of course, several new proposals of aseismic systems have been known in the last twenty years. One of these proposals deals with the destruction of energy by means of a vibration absorber installed in the top slab of the construction (Wirsching P. H., Campbell G. W.: "Minimal structural response under random excitation using the vibration absorber"; International Journal of Earthquake Engineering and Structural Dynamics, Vol. 2, 1974). Others propose to put the superstructure of the construction on horizontally moving roller bearings with elastic elements building up elastic return forces (Matsushita K., Izumi M.: "Studies on mechanismes to decrease earthquake forces applied to buildings"; Proceedings of the 3rd World Conference on Earthquake Engineering, London, 1965). Finally, there are proposals to suspend the superstructure in order to separate it from the direct influence of ground excitations (Oto Lanios C. J. et al.: "Study of the behavior of a hanging building under the effect of an earthquake"; Proceedings of the 4th World Conference of Earthquake Engineering, Santiago de Chile, 1969).

Need for an improved earthquake protection

All these and similar ideas did not influence very much the conventional or so-called 'earthquake-adapted' method of construction, used for earthquakes up to medium intensity. With smaller earthquakes, this method grants an efficient protection for the human lives as well as a minimum safety for the construction, though structural damages up to a wrecking state have to be put up with. But this protection is insufficient for high earthquake intensities. Dangerous situations to be dealt with arise especially for seismic high risk constructions in highly seismic regions. Such constructions are considerably endangered by the sudden and unexpected occurrence of earthquakes or other quake-like excitations. Especially concerned are facilities for public supply with vital functions (hospitals, administrative headquarters, command centers); for transportation (important bridges, railway stations, tunnels); for energy supply (coffer dams, power stations, fuel storage); of the industrial sector (chemistry plants, explosive manufactures); for military needs; as well as structures with high concentrations of people (sky-scrapers, convention buildings, movie theaters, schools, shelters). The existence of some of these constructions situated in highly seismic regions depends basically on the technical capacity to realize the integral earthquake protection. The need for improved earthquake protective systems is thereby clearly established.

Problem to be solved

There is the underlying understanding for the conventional, 'earthquake-adapted' method of construction that the fundamental structural eigenfrequencies lie most inevitably in the range of resonance of typical earthquake response spectra. The kinetic energy transmitted to these constructions by the soil excitations is transformed into structural deformations. As long as these structural deformations remain in the elastic range, the structure will not be damaged. In case of excitations resulting in structural deformations exceeding the yield limit of the material however, there appear ruptures which may end in the collapse of the construction.

Full base isolation of constructions

An important progress in the seismic safety of constructions could be achieved, when the structural deformations, occurring mainly in the superstructure of conventionally designed constructions, were successfully removed from this rupture endangered zone. To achieve this goal, the Swiss Pat. No. 450.675 proposed to use highly elastic isolators as flexible zones, placed in between the superstructure of the construction and its foundation. This produces a so-called 'fully base isolated' or 'elastically floating' construction.

This procedure is well known from the mounting of machine foundations on elastic bearings, and its application to constructions has already been described in specialized periodicals (Hubacher C., Staudacher E., Siegenthaler R.: "Erdbebensicherung im Bauen"; Neue Zürcher Zeitung, Technikbeilage, Feb. 9, 1970). The concern is full base isolation (3-dimensionally floating), to be distinguished from the horizontal base isolation. While the isolators of the latter are highly elastic, merely in the horizontal plane (Delfosse G. C.: "The GAPEC System—A new highly effective aseismic system"; Proceedings of the 6th World Conference on Earthquake Engineering, New Dehli, 1977), the former are flexible in all directions, i.e. also vertically.

Integral earthquake protection by full base isolation

Although the advantages of this aseismic system were generally known, there was no awareness of the fact that the concept of the full base isolation of constructions could be improved, by additional, appropriate technical measures, up to their integral protection against the strongest earthquakes known yet.

Judging the conventional methods to verify the safety against earthquakes

For the exact numerical verification of a construction, in principle, the mechanical properties of all elements of the system, i.e. construction, isolators, foundation and soil, have to be known. The mass, damping and stiffness distributions of the superstructure, the possibly present isolators, the foundation and the soil are introduced into the mathematical model of the system, to determine the dynamic response corresponding to a given seismic load reliably.

But the today most commonly applied numerical methods using very much simplified finite element models, which are proposed in the legal construction standards, do not allow to meet the requirements of the integral earthquake protection. Thus, the current spectral analysis method using mean value response spectra is resulting in a possible error margin of several hundred percent, while the cost of a modal or linear incremental analysis become comparable with the cost of the raw construction. It is important to keep in mind that, in order to achieve the integral earthquake protection, those exposed elements of the structural frame have to be located whose failure could first initiate the collapse of the structural frame. —How then, the design according to the requirements of integral earthquake protection can it be actually verified in practice?

Also, the technique for defining the loading case "earthquakes" has an important deficiency: There is no direct mathematical relation between the seismological quantities to indicate the strength of a given earthquake deduced from estimated intensities or measured magnitudes and quantities directly used by engineers, based on the acceleration functions of a signal. —How then, a relation between seismic risk maps and legal loading case prescriptions can it be established?

The criticism is based on the fact that in the earthquake protection of structures one operates with an insufficiently known loading case and with numerical methods simplifying the actual situation in an inadmissible way;

that the commonly used finite element models are not detailed enough for the exact verification of the structural frame, respectively that they are too expensive in actual applications when detailing it correctly (i.e. uneconomic models versus insufficiently exact results);

that the laws describing the construction material behavior (e.g. reinforced concrete) under seismic excitation are not sufficiently known.

Thus, the seismic forces in a structural frame, computed by conventions according to the standards, must be looked at as an unreliable estimate of the actual forces which, in reality, can exceed them several times.

The philosophy of limited earthquake protection as found in modern earthquake standards corresponds to these observations. It requires that constructions resist small earthquakes, occurring periodically at the construction site, with as little damage as possible and that, when intensive respectively extreme earthquake excitations occur, the protection of human life has the priority over the protection of the construction.

The reason, why the philosophy of protection has been limited in this way, was not merely because it would be uneconomic to request more consequent structural protection measures for all constructions in highly seismic regions. In practice, the tools did actually not exist to realize technically, respectively to verify numerically, if the integral earthquake protection was achieved. Finally, there existed a considerable legal insecurity in the determination of the loading case "earthquakes" for which science did not yet provide approved bases for its definition.

Goal

The goal of the present invention is to eliminate the mentioned disadvantages and to render practicable the integral earthquake protection of constructions or similar bodies. By the proposed technical measures, they shall resist repeatedly and without damage to the strongest earthquakes ever measured at the construction site, respectively to be expected there from previously defined or known cases. The technical measures shall be such that the integral protection aimed at be proven by computation or experimentation in a simple, reliable and economic way.

In an extended context of the invention, the protection of bodies against excitations of general nature shall be achieved. Besides natural earthquakes, artificial earthquakes resulting from nuclear or conventional bomb explosions as well as blastings, airplane crashes, shell impacts and other shock-like effects can be included in the invention goal. Apart from bodies like constructions, shelters, powerplants, and military facilities, big machines and isolator stations can also be protected. Not only the actual foundation soil of detached free-standing constructions, but also a cavern rock, machine chassis or a structural part supporting endangered instruments, can assume the role of the excited medium. The preceding enumeration does not claim to be exhaustive, of course. As an endangering event is to be considered also e.g. an airplane crash on a reactor building which contains a big machine.

SUMMARY OF THE INVENTION

For a mechanically in all directions isolated body of the nature mentioned, the goal set is achieved according to the invention in such a way that there is a frequency range called "hole of eigenfrequencies" between the highest of the six lowest system eigenfrequencies (called fundamental eigenfrequencies) and the lowest of all higher system eigenfrequencies (called upper eigenfrequencies) of the oscillatory element consisting of the superstructure D and the isolators C. In this frequency range, which range is sometimes referred to herein as a gap in the structural frequencies, the oscillatory element presents no structural eigenfrequencies. Also, the hole of eigenfrequencies should lie in the "resonance range of the endangering design response spectrum" of the excitation.

In the case of the body being a construction, the mechanical isolation in all directions is reached by means of horizontally and vertically highly elastic damping elements (mechanical isolators) which are inserted between the superstructure and its foundation after having separated both parts of the structure. By appropriate mass distribution of the superstructure and stiffness distribution of the isolators, the six fundamental eigenfrequencies of the oscillatory element can be placed in a range which lies beneath the range of resonance of the design response spectrum of the excitation and all upper eigenfrequencies can be placed in a range which lies higher than the range of resonance.

The superstructure is to be of rigid conception. For that, it is designed box- or honeycomb-like, with continuous and supporting exterior walls. By that measure, it will have the ability to cope with the arbitrarily directed dynamic forces within the structural frame. Thus, an earthquake-adapted conception of the structure is reached which, as such, is also required by seismic standards for conventional constructions. This measure results in the upper eigenfrequencies of the structure rising above the upper limiting value of the spectral range of resonance, if it stands on in all directions highly elastic isolators at the same time.

The foundation is linked rigidly to the surrounding formation, e.g. the surrounding soil forms with it a rigid unity wherefore the foundation can be designed as a continuous slab or a hod or a specially designed intermediate story. The vertical stiffness of the soil should be at least six to nine times greater than the vertical stiffness of the isolators, so that the influence of the soil flexibility can be neglected for numerical verification needs.

As a consequence of such a conception of the construction and the isolators, a gap in the structural eigenfrequencies in the range of resonance of typical seismic strong-motion response spectra is formed.

Through appropriate design of all components of the isolated construction, in accordance with the invention, the construction resists without damage to the greatest strong-motion earthquakes ever measured or to be expected at the construction site. It is therefore integrally protected against earthquakes. With that is meant that the protected part of the construction be able to resist repeatedly extreme seismic excitations without elastoplastic deformations (destructions) in its structural frame.

DESCRIPTION OF THE PREFERRED EMBODIMENT

Excitation in the medium A

Figure 1:
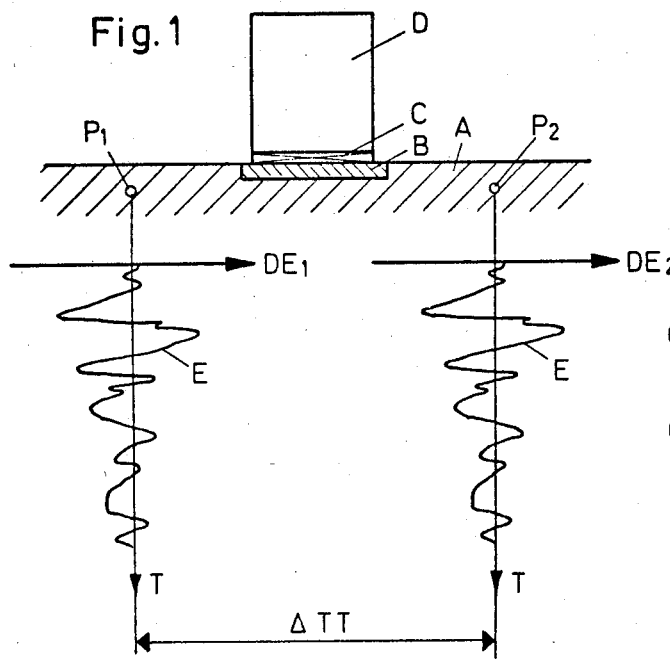
FIG. 1 schematically shows a structure standing on a foundation soil sensitive to seismic excitations.

The endangered structure D represented in FIG. 1 is connected over an isolator zone C to the foundation B and the surrounding formation A, e.g. to the foundation soil. P(1) and P(2) define the reference points of a measurable excitation wave E, e.g. an earthquake, expressed in the time domain T as a 3-dimensional acceleration function with the translations and rotations [DE(T)].

The notion 'excitation' stands for any (3-dimensional) dynamic motion in the surrounding medium A, which transmits itself onto the isolator zone C of the body D. These motions can turn out to be shock-like, periodic, or pseudo-periodic oscillations.

As 'intensive and extreme excitations' are to be understood such kinds of dynamic motions of the isolators C which can endanger the mechanical integrity of the body D or restrain its normal use in an inadmissible way or render it impossible, as long as no protection measures are taken.

The excitations can be defined in a deterministic way as time or frequency functions, or probabilisticly as design spectrum forms. The specific character of the excitation is described as a combined Fourier amplitude and a phase spectrum or a so-called response spectrum. The decisive quantities are then the frequency content of the signal, i.e. the spectral distribution of the amplitudes as a function of frequency, and the maximum acceleration of the signal, for calibration purposes.

Figure 2:
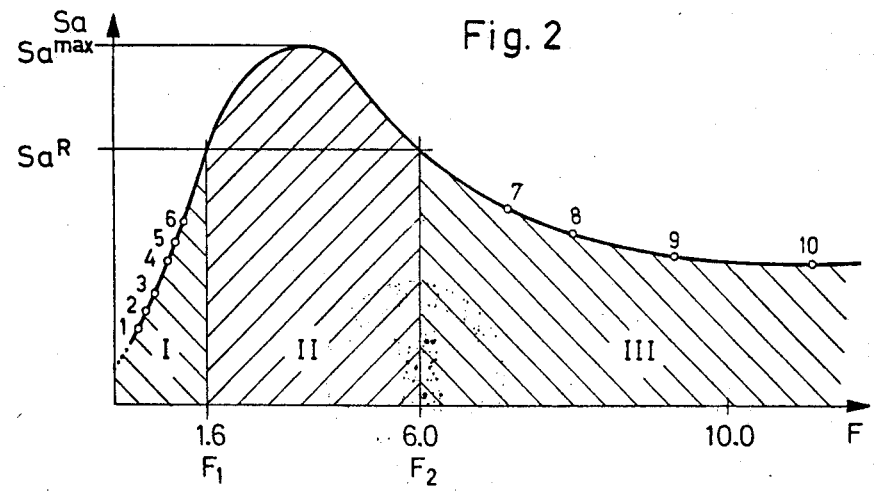
FIG. 2 a Fourier amplitude spectrum of an earthquake.

A seismic response spectrum similar to FIG. 2 is considered as a typical seismic design spectrum, wherein the possible fundamental eigenfrequencies and lowest upper eigenfrequencies of the proposed oscillatory element, consisting of the body D and the isolators C, are shown. This kind of a design response spectrum is computed from one or several standardized time functions. By means of a well known numerical procedure, the maximal response of a simple (un)damped oscillator to a given excitation is established and shown graphically as a function of the oscillator eigenfrequency. For typical seismic excitations on soil level, there results a central frequency band with high amplitudes. This band is called the range of resonance of the response spectrum.

In FIG. 2, F stands for the frequency and Sa for the acceleration response spectrum of the excitation. Sa(max) is the peak or maximum value of the spectral acceleration in the range of resonance, and Sa(R) is its reference or limiting value, whereby F(1) and F(2) are designed as corresponding limiting frequencies of the range of resonance.

The upper and lower limitation of the complete spectral frequency range F results from the specific character of the excitations against which the proposed technical measures are taken. The range of resonance covers the resonance endangered structural eigenfrequencies. It is determined as that central range II of the amplitude spectrum whose spectral accelerations exceed the limiting or reference value Sa(R). This limiting value Sa(R) can be expressed as a function of the maximum value Sa(max), e.g. Sa(R)=0.8×Sa(max). Beneath range of resonance II is the range of the lower, fundamental eigenfrequencies and above is range III of the upper eigenfrequencies.

The fundamental eigenfrequencies of most constructions fall generally in range II of the schematic Fourier amplitude spectrum. The values delimiting the range of resonance for firm soils lies between 1.6 Hz and 6.0 Hz (values by experience varying with the soil quality). This results in the following widths of the ranges:

Range I: <1.6 Hz
Range II: between 1.6 Hz and 6.0 Hz
Range III: >6.0 Hz

It is to be considered that all statements concerning structural eigenfrequencies refer to the oscillatory element (body D with isolators C, FIG. 1) as a whole, and not to parts of the body D alone.

Delimitating the danger resulting from excitations

The kind of danger resulting from excitations for conventionally designed constructions which are to be protected by the proposed technical measures, is delimited as following:

(a) Danger of collapse, for constructions of conventional design having resonance-endangered eigenfrequencies in range I. The excitation of the foundation B can cause unadmissibly big deformations in the structural frame of the construction D. This results in destructions on the most exposed structural elements: Threat to the mechanical integrity (collapse of the construction or being of no use anymore) of parts of or the whole construction.

(b) Danger of resonance, for constructions of a conventional design having resonance-endangered eigenfrequencies in range II or for instruments inside the construction D. The resonance effects produced in the construction result in an over-loading of the activated structural elements: Damages in parts of, or on the whole construction or on objects inside the construction.

(c) Danger of brittle fracure, for constructions of conventional design having resonance-endangered eigenfrequencies in range III. The excitations of the soil have a frequency content which results in shock-like strain releases: brittle fracture destructions. Brittle fracture destructions suppose a brittle response behavior of the used construction materials within the frequency range of resonance.

(d) Danger of over-loading due to differential movements of the bearings. The passing of an excitation wave from P(1) to P(2) (FIG. 1) can result in big differential bearing displacements: Damages resulting from the tendency of the construction to pull itself locally from the bearings.

Included are damages from loading combinations of the above-mentioned loading cases (a) to (d); many of the constructions of conventional design typically have resonance-endangered eigenfrequencies in ranges II and III.

Practical application

For a better understanding, an example of a construction exposed to extreme earthquakes illustrates the proposed technical measures which are introduced to achieve the goal of the integral earthquake protection, as well as the possibility of a simple way to verify it numerically. These measures apply directly to other applications.

The superstructure D, which is to be protected, is propped over the isolators C on the foundation B, the same linked firmly with the soil A (FIG. 1). The schematized soil movement is called E.

The protected superstructure D comprises ordinarily all parts of the construction which are not firmly bound in the soil. The superstructure D can prop itself directly on the foundation or lie on the basements, which are bound to the surrounding soil, acting in this case as an intermediate foundation.

Figure 3:
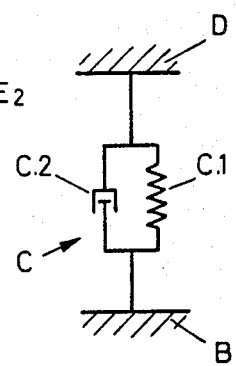
FIG. 3 schematically illustrates a mechanical isolator constructed in accordance with the invention.

Mechanical isolators C have a dual function: on the one hand, they control the oscillatory behavior of an elastic system and on the other hand, they exert a damping effect. Accordingly, the schematically illustrated isolator of FIG. 3 presents a spring element C.1 and a damping element C.2. In one embodiment the isolator has a top and a bottom plate bonded together with rubber sheets so that the isolators firmly connect the superstructure with the foundation. The rubber sheets among themselves are glued together so that they can absorb the deformations in tension/compression, and in shear. Isolators constructed in this manner are highly elastic in all directions.

Basically, two isolator types may be used: vertically and horizontally flexible bearings of natural rubber, which combine spring and damping properties in a single element, or steel springs combined with independent 3-dimensional damper elements. The natural rubber bearings are preferred to the steel-spring/damper combination due to their considerably superior damping and because they correspond ordinarily—with the required durability—to the special elasticity requirements. Vertically supporting steel springs, according to the present state of the art, are not considered able to cope with the big horizontal displacement capabilities required for systems safe against extreme earthquakes.

In the position at rest of the oscillatory system, isolators have to transmit the static forces of the superstructure to the foundation. Their geometric positions and individual stiffness are basically determined by the mass distribution in the superstructure and cannot be influenced without considerable technical measures; i.e. that vertical loads on foundation level have ordinarily to be absorbed where they appear, whereby the following design types are possible: A "carpet" of isolators consisting of merely identical elements; a "carpet" of isolators consisting of individually adapted elements: a terraced disposition; free positioning.

The following foundation design variants are possible: A classic foundation with additional elements to integrate the aseismic system (foundation directly bound to the soil); an intermediate storey separating the basements from the upper stories and containing the additional elements of the aseismic system.

Independently of the chosen variant, the foundation design has to meet the following requirements: As zone designed to support loads and to be very stiff in all directions; uncontrolled relative displacements between the supporting areas must be prevented; isolators are to be protected against damaging environmental influences; to check, maintain and replace the isolators, the access to them must be easy; it must give a full-proof acceptance of the classic loading cases (dead weight, live loads, wind and snow).

Figure 4:
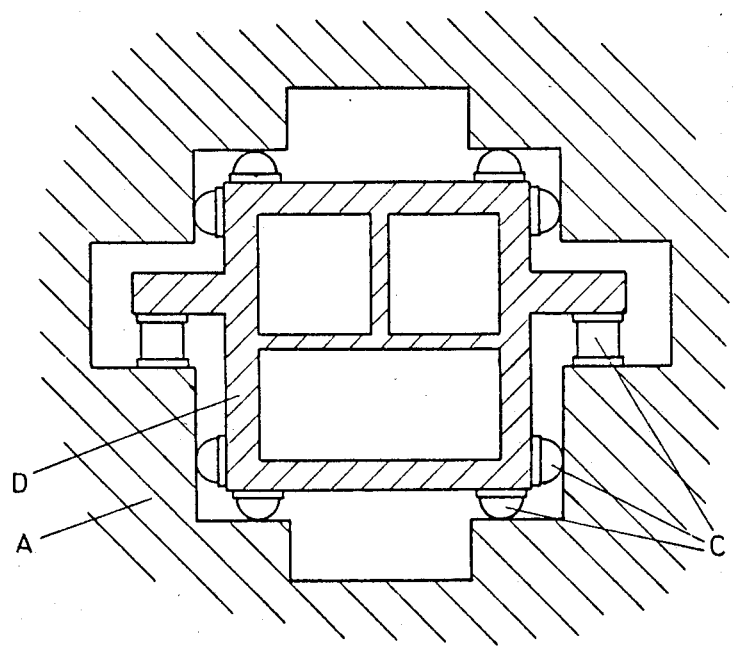
FIG. 4 shows in cross-section a shelter in a cavern which is isolated from ground motions in accordance with the invention.

As another execution form of the invention, FIG. 4 shows a shelter D propped over isolators C surrounded by the walls of a cavern.

It has been proven by computation that, in order to protect a fully base isolated construction in an integral way, the following three technical measures have to be applied:

The six fundamental eigenfrequencies (1-6) of the system have to be transferred in the frequency range I (FIG. 2). This happens by means of mechanical isolators which are highly elastic in all directions (i.e. also vertically). Either of the lowest fundamental eigenfrequencies (1 and 2) shall not be higher than about 40% of the lower limiting frequency F(1) of the range of resonance, to fully isolate the system. The fundamental eigenfrequency (6) may rise just beneath the level of the limiting frequency F(1), to transmit correctly the static forces to the foundation.

The superstructure has to be designed in such a way that all of the upper eigenfrequencies (7, 8 . . . ) of the base isolated system lie in the frequency range III. For this purpose, a box- respectively honeycomb-like conception of the superstructure was chosen. The exterior walls of the construction have to be supporting, continuous, solid and contain not more openings than necessary. The superstructure preferably includes interior supporting elements comprising generally horizontally oriented, vertically spaced-apart slabs extending between the exterior walls and vertically oriented load-bearing supporting members between the slabs. Their joint action, together with the slabs, inner walls and columns has to be guaranteed by well known construction measures. Appropriate design will exclude relative movements of element joints, element boundaries and construction sections. A honeycomb-like conception results, when the slabs and the supporting inner walls are included in the bracing of the box-like outlay of the construction.

The foundation and the foundation soil together, have to form a rigid unity. For that purpose, a firm foundation soil has to be chosen, e.g. rock, bedrock or appropriate consolidated sediments of good quality, whose vertical stiffness is at least six to nine times superior to the total isolator stiffness. The foundation itself has to be designed generally as a continuous slab or as a hod. By this, the relative movements between the supporting areas can be reduced to a negligible quantity and the influence of the soil flexibility can be neglected in the numerical model.

These technical measures have the following effects:

In the range of resonance of the design spectrum (range II, FIG. 2), a zone without structural eigenfrequencies is formed: hole of eigenfrequencies in the range of resonance of the seismic response spectrum.

Owing to the fact that all of the fundamental structural eigenfrequencies are very low, only considerably reduced parts of the higher frequency content of the soil excitation E are transmitted to the superstructure. Thus, the danger of brittle fracture in the superstructure is averted.

Thanks to the rigid conception and to the high mechanical isolation, no danger of collapse exists anymore for the superstructure.

Possible differential displacements of the supporting areas during the passing of a seismic wave are seized at their source (relative movements between the highly elastic isolators) and thus reducing considerably the danger of a local over-loading in the superstructure.

In addition, important simplifications result for the mathematical model:

For mathematical purposes, the superstructure may be treated as a rigid body even in the main stage of the numerical analysis. It has merely the six degrees of freedom of a rigid body in space. In practice, and compared to 'exact solutions', the quality of the results is barely influenced.

The influence of the soil flexibility can be neglected in the mathematical model, if the unloaded, so-called 'free-field eigenfrequencies' of the soil amount at least to two and a half to three times the highest fundamental eigenfrequencies of the base isolated construction: Thus, the interaction construction/soil can be neglected in this case.

The influence of the upper eigenfrequencies (from the 7th system frequency on) on the excitation load of the protected part of the construction may be neglected in the mathematical model.

Problems of resonance in the protected part of the construction can be treated with locally due to its rigid conception. There is no interaction possible between locally resonance-endangered parts and the protected part of the construction due to its rigid conception.

As a consequence, a tool has been developed to verify numerically if a structure meets the requirement of the integral earthquake protection against extreme earthquakes. The following procedure is considered appropriate to furnish this proof for loads corresponding to extreme earthquakes. It is based on the fact that, by an appropriate definition of the loading case, extreme earthquakes can be distinguished by their intensity and character from standard earthquakes occurring periodically in a highly seismic region. (This way of defining the loading case can be transposed appropriately to the other dynamic loading cases mentioned.) Thus, the numerical verification of earthquake-safety is realized in the following steps:

Step 1 Definition of the loading cases "extreme earthquakes" and "standard earthquakes" valid for the construction site Step 2 Standard earthquake safety verification of the construction with an inactive earthquake protection system, according to the prescriptions of the earthquake standards of the concerned region and assuming a restriction to elastic deformations Step 3 Location of the most unfavorable directions of incidence by rotating 3-dimensional design earthquakes around the foundation of the construction with an active earthquake protection system—Approximative spectral or exact modal/incremental analysis in the most unfavorable directions of incidence Step 4 Analysis of the influence of technically possible variations of the mass, damping, and stiffness distribution of the construction with an active earthquake protection system—Parameter analysis by repetitive spectral analysis in the most unfavorable directions of incidence Step 5 Determination of the extreme response values (movements and forces) of the global construction and of parts of it with an active earthquake protection system—Modal or incremental analysis with extreme design earthquakes in the most unfavorable directions of incidence Step 6 Verification of the design of the structural frame with the most unfavorable force combinations of the static and dynamic loading cases—Actual safety verification Step 7 Analysis of local resonance problems in distinct parts of the construction—Analysis with simple finite element models using the resulting kinematical responses of step 5 as input functions.

For steps 3 to 6, the structure has to be defined as a 3-dimensional model. The structural analysis has to be so detailed that the analysis allows to locate actually those exposed structural elements which undergo first elasto-plastic deformations.

To confirm the numerical verification of a fully base isolated construction by experimentation, a model of a standard construction has been chosen and exposed to an excitation corresponding to the most intensive earthquakes known yet.

Figure 5:
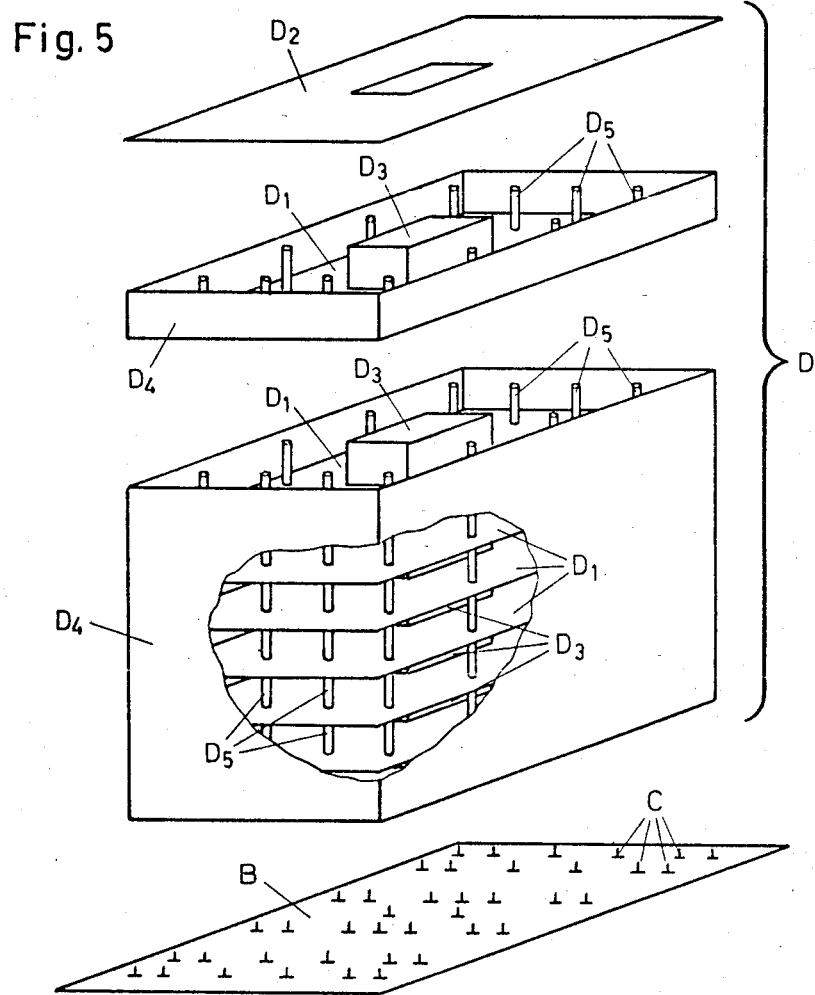
FIG. 5 is an exploded perspective view of a model of a standard structure for the numerical or experimental verifiaction of the integral earthquake protection.

This standard construction, presented in exploded view in FIG. 5, shows a clear static and dynamic conception. The ground-plane has a punctual symmetry and the design is monolithic, compact, and box- and honeycomb-like. It guarantees a strong rigid construction. Again, the superstructure is called D, the isolators C and the foundation B. The storey slabs D.1, the roof D.2, the core D.3 with the staircase, the inner and exterior walls D.4 and the columns D.5 contribute all to the inner bracing of the construction.

This standard building is representative for a tower-like building.

In applying the proposed technical and analytical means to this building, the feasibility has been established of a structure meeting the requirements of the Integral Earthquake Protection. Thus, it has been proven by an extended numerical and experimental verification that it is possible in practice to create a hole of eigenfrequencies covering the range of resonance of the seismic design spectrum.

I claim:

1. In a body, integrally protected against damage from motions transmitted through the ground; said motions being measurably expressed in form of a design response spectrum having a predominant resonance range where acceleration amplitudes are highest, said motions being transmitted by mechanical isolators which three-dimensionally yieldingly connect the body to a base, the base being rigidly linked to a surrounding formation, the combined body and isolators having a series of structural frequencies including a set of six lower, fundamental structural frequencies and a set of upper structural frequencies, the improvement comprising:

means providing the combined body and isolators with a gap in said series of structural frequencies of the combined body and isolators, said gap lying between the highest of said six fundamental structural frequencies and the lowest of said upper structural frequencies of the combined body and isolators, said means being further formed to select said gap so that said gap falls within said resonance range of said design response spectrum, whereby the body is devoid of structural frequencies within said resonance range of said design response spectrum and is thereby isolated from corresponding high amplitude motions transmitted through the ground.

2. A body according to claim 1 wherein said means is formed so that either one of the lowest two fundamental structural frequencies of the combined body and isolators is no more than about 40% of the highest fundamental structural frequency thereof.

3. A body constructed according to claim 1 wherein said means is formed so that the highest fundamental structural frequency of the combined body and isolators is not substantially more than 1.6 Hz and the lowest upper structural frequency thereof is not substantially less than 6.0 Hz.

4. A body according to claim 1 wherein the base comprises a continuous stiff base mat extending over substantially the entire plan configuration of the body.

5. A body according to claim 1 wherein the formation comprises a firm subsoil surrounding the base.

6. A body according to claim 1 wherein both the formation and the body each have a vertical stiffness, and wherein the isolators each have a vertical stiffness which is at most one-sixth the vertical stiffness of a selected one of said body and said formation.

7. A body according to claim 1 wherein said body comprises one of a building, a machine and an electrical substation.

8. A body according to claim 7, wherein said body comprises a machine and said formation comprises a support structure surrounding said base.

9. The invention according to claim 1 wherein said body comprises a stiff box-like structure including exterior and interior support elements forming together a load-bearing structural frame.

10. The invention of claim 9, wherein said exterior support elements comprise an exterior wall and top and bottom plates disposed to as to provide substantially continuous exterior bracing support of said box-like structure.

11. The invention according to claim 10 wherein said interior support elements comprise a load-bearing inner wall and a substantially continuous horizontal plate extending between said inner wall and said exterior wall, said inner wall and horizontal plate being disposed so as to provide interior bracing support of said box-like structure.

12. A building structure protected against damage from motions transmitted through the ground, comprising a foundation in direct contact with and linked rigidly to the surrounding ground;
  a rigid superstructure elastically supported above said foundation, said rigid superstructure having continuous and supporting exterior walls;
  elastic isolators between said foundation and superstructure to provide the elastic support of said rigid superstructure, said elastic isolators working in all directions and having a vertical stiffness which is at least 6–9 times less than the vertical stiffness of the surrounding ground; and
  wherein said rigid superstructure and elastic isolators are selected to provide a range of resonance which lies between the sixth and seventh eigenfrequencies of the combined superstructure and isolators.

13. A building structure according to claim 12 wherein said range of resonance lies between 1.6 Hz and 6.0 Hz.

* * * * *